United States Patent [19]
Palmieri et al.

[11] Patent Number: 5,481,478
[45] Date of Patent: Jan. 2, 1996

[54] BROADCAST SYSTEM FOR A FACILITY

[76] Inventors: Herman D. Palmieri, 1532 Eben St., Pittsburgh, Pa. 15226; Martin Gutwerk, 801 Summitt St., McKeesport, Pa. 15132

[21] Appl. No.: 253,685

[22] Filed: Jun. 3, 1994

[51] Int. Cl.$^6$ .............................. H04H 5/00; H04H 1/00
[52] U.S. Cl. .................. 364/514 R; 381/82; 455/4.1; 348/8; 340/310.01; 340/310.06; 340/310.07
[58] Field of Search ................... 364/514 R, 492; 381/82; 455/3.1, 4.1; 348/8, 9; 340/310.01, 310.06, 310.07

[56] References Cited

U.S. PATENT DOCUMENTS

| | | | |
|---|---|---|---|
| 3,426,339 | 2/1969 | Rich et al. | 340/174.1 |
| 3,566,038 | 2/1971 | Slavin | 179/15 |
| 3,585,307 | 6/1971 | Greenburg | 179/15 BF |
| 3,795,771 | 3/1974 | Gundersen et al. | 179/15 A |
| 3,882,466 | 5/1975 | Poorvin | 340/172 |
| 3,980,954 | 9/1976 | Whyte | 325/48 |
| 3,993,955 | 11/1976 | Belcher et al. | 325/308 |
| 4,428,078 | 1/1984 | Kuo | 455/3 |
| 4,697,166 | 9/1987 | Warnagiris et al. | 340/310 R |
| 4,714,912 | 12/1987 | Roberts et al. | 340/310 R |
| 4,745,391 | 5/1988 | Gajjar | 340/310 |
| 4,837,556 | 6/1989 | Matsushita et al. | 340/310 R |
| 4,847,782 | 7/1989 | Brown, Jr. et al. | 364/492 |
| 4,866,515 | 9/1989 | Tagawa et al. | 358/86 |
| 4,912,457 | 3/1990 | Ladd | 340/573 |
| 4,958,381 | 9/1990 | Toyoshima | 455/4 |
| 4,973,940 | 11/1990 | Sakai et al. | 340/310 R |
| 5,032,820 | 7/1991 | Tanikawa et al. | 340/310 R |
| 5,034,808 | 7/1991 | Murray | 358/86 |
| 5,065,133 | 11/1991 | Howard | 340/310 A |
| 5,148,144 | 9/1992 | Sutterlin et al. | 340/310 A |
| 5,151,838 | 9/1992 | Dockery | 340/310 R |
| 5,210,519 | 5/1993 | Moore | 340/310 R |
| 5,223,826 | 6/1993 | Amou et al. | 340/825.06 |
| 5,257,006 | 10/1993 | Graham et al. | 340/310 A |
| 5,289,272 | 2/1994 | Rabowsky et al. | 348/8 |
| 5,311,302 | 5/1994 | Berry et al. | 348/14 |
| 5,345,592 | 9/1994 | Woodmas | 455/3.3 |
| 5,349,644 | 9/1994 | Massey et al. | 395/200 |
| 5,406,249 | 4/1995 | Pettus | 340/310.06 |

Primary Examiner—Ellis B. Ramirez
Assistant Examiner—Patrick J. Assouad
Attorney, Agent, or Firm—Clifford A. Poff

[57] ABSTRACT

A broadcast system for a facility including audio and video signal generators that may also include the audio output of a microphone for forming broadcast signals. The broadcast signals include a program signal, a supervisory program signal and a supervisory alert signal. The power supply for monitoring stations and broadcast signals are combined to form an output signal that is broadcasted throughout the facility. A bus distributes the output signal in the facility to each of a plurality of monitor stations. Each monitor station includes decoders to recover the audio and video signals and form a resident power supply for that monitor station only from the output signal on the bus. The monitor could also includes a video monitor and speaker coupled to the resident amplifier to the resident power supply for responding to any of the broadcast signals. A resident controller controls the resident amplifier when receiving a program signal supplied to the monitor. A resident executive controller disables the resident controller and applies a recovered supervisory alert signal and supervisory program signal to the resident amplifier.

30 Claims, 8 Drawing Sheets

FIGURE 1

BROADCAST SYSTEM FOR A FACILITY

BACKGROUND OF THE INVENTION

1. Field of the Invention

The present invention relates to an audio/video broadcast system for a facility to allow reception and display of broadcast signals at each of a plurality of monitor stations while programming at each station is subject to an overriding executive control that will override control settings by the user at each monitor station. More particularly the present invention relates to such a broadcast system particularly suitable for use in mass transit vehicles that will minimize the installation requirements by use of a bus to supply each monitor with not only program material but also with an override alert; an executive signal and a power supply from the signal conveyed by the bus.

2. Description of the Prior Art

While not so limited, the present invention is particularly useful for use in mass transit systems such as buses providing inner city transit service as well as trains, subway, airplane and terminals used for mass transit. In such mass transit systems, it is believed that a need exists for a audio and/or video system to present within the mass transit vehicle not only announcements regarding particulars of the mass transit service but also, for example, advertising information as well as entertainment programming for the ridership. A public address system, for example, does not allow ridership intervention to accommodate individual volume adjustments that might be desirable or essential at each speaker location to insure meaningful communication with the ridership. Sometimes the audio level is too low for those in the immediate area of the speaker to acquire an effective understanding of the message, while in other instances the volume is too high and thus a nuisance. In addition to public service announcements, a broadcast system within the facility may utilize state of the art audio and video technologies to insure ridership acceptance of not only service announcements but also entertainment and advertisement-type programming. Multi-aspect of communications for such a broadcast system must be produced with great continuity and without notable inflections both audio and/or video between the various different modes of communication, i.e., announcement, advertisement and entertainment.

Accordingly, it is an object of the present invention to provide a broadcast system for a facility wherein each of a plurality of monitors responsive to an input comprised of an audio and/or video signal are also responsive to an executive control superseding all local control functions of the monitors at least as long as the executive control persists.

It is a further object of the present invention to provide a broadcast system for a facility wherein each of a plurality of monitors are responsive to an input comprised of at least an audio signal to enable a simultaneous recording of an audio announcement while supplied under an executive control to locally amplified speakers forming part of the monitor.

It is another object of the present invention to provide a broadcast system for a facility wherein lack of a plurality of monitors is equipped to generate a signal applied to an operator's station as an alert to the operator, e.g., an alarm signal that a rider desires to exit a bus at a next designated stop.

It is a further object of the present invention to provide a combined video and audio broadcast system for a facility wherein the video broadcast includes a line assignment as an inclusion to the video broadcast and the audio broadcast includes a voice override.

SUMMARY OF THE INVENTION

According to the present invention there is provided a broadcast system for a facility, the system including means for producing each of a plurality of broadcast signals including a program signal, a supervisory program signal and a supervisory alert signal, a supervision controller for the broadcast signals, power supply means having output terminals on which there appears a desired power supply for monitoring stations, means for combining the program signals with the power supply to form an output signal suitable for broadcast within the facility, bus means for distributing the output signal in the facility to each of a plurality of monitor stations, and the plurality of monitoring stations each including (a) means connected to the bus means to recover broadcast signals and form a resident power supply from the output signal, (b) a monitor coupled to a resident amplifier and powered by the resident power supply for responding to any of the plurality of recovered broadcast signals, (c) a resident controller for controlling the resident amplifier when receiving a program signal supplied to the monitor, and (d) a resident executive controller for disabling the resident controller and applying the supervisory alert signal and supervision program signal to the resident amplifier.

BRIEF DESCRIPTION OF THE DRAWINGS

The features and advantages of the present invention as well as other will be more fully understood when the following description is read in light of the accompanying drawings in which:

FIG. 1 is an electrical diagram to illustrate encoding and decoding of an audio signal on an impressed DC voltage and recovery in the broadcast system of FIG. 1;

DETAILED DESCRIPTION OF THE DRAWINGS

Figure 1:
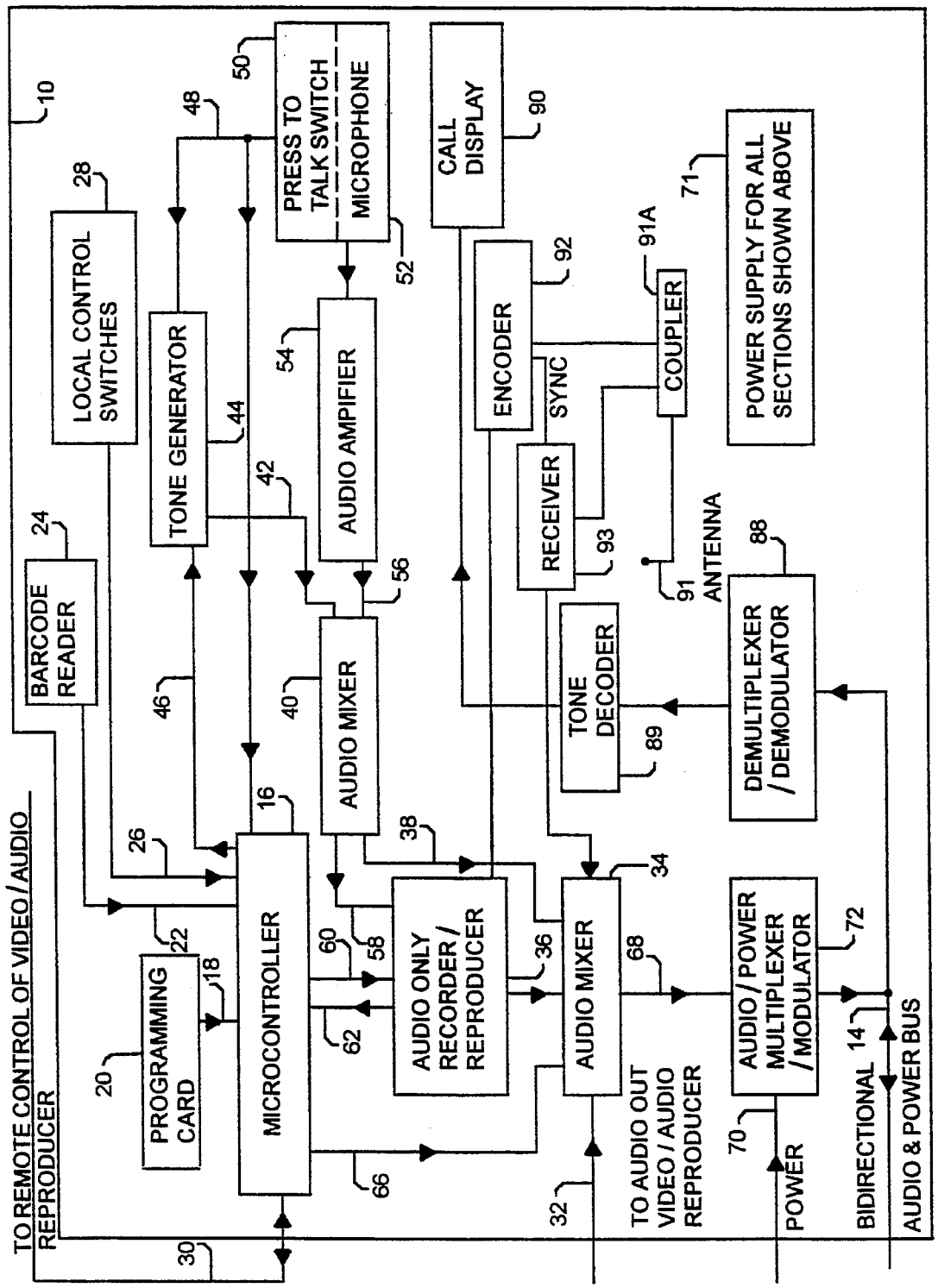
FIG. 1 is a block diagram of a first embodiment of the broadcast system for broadcasting audio in a mass transit vehicle.
Figure 2:
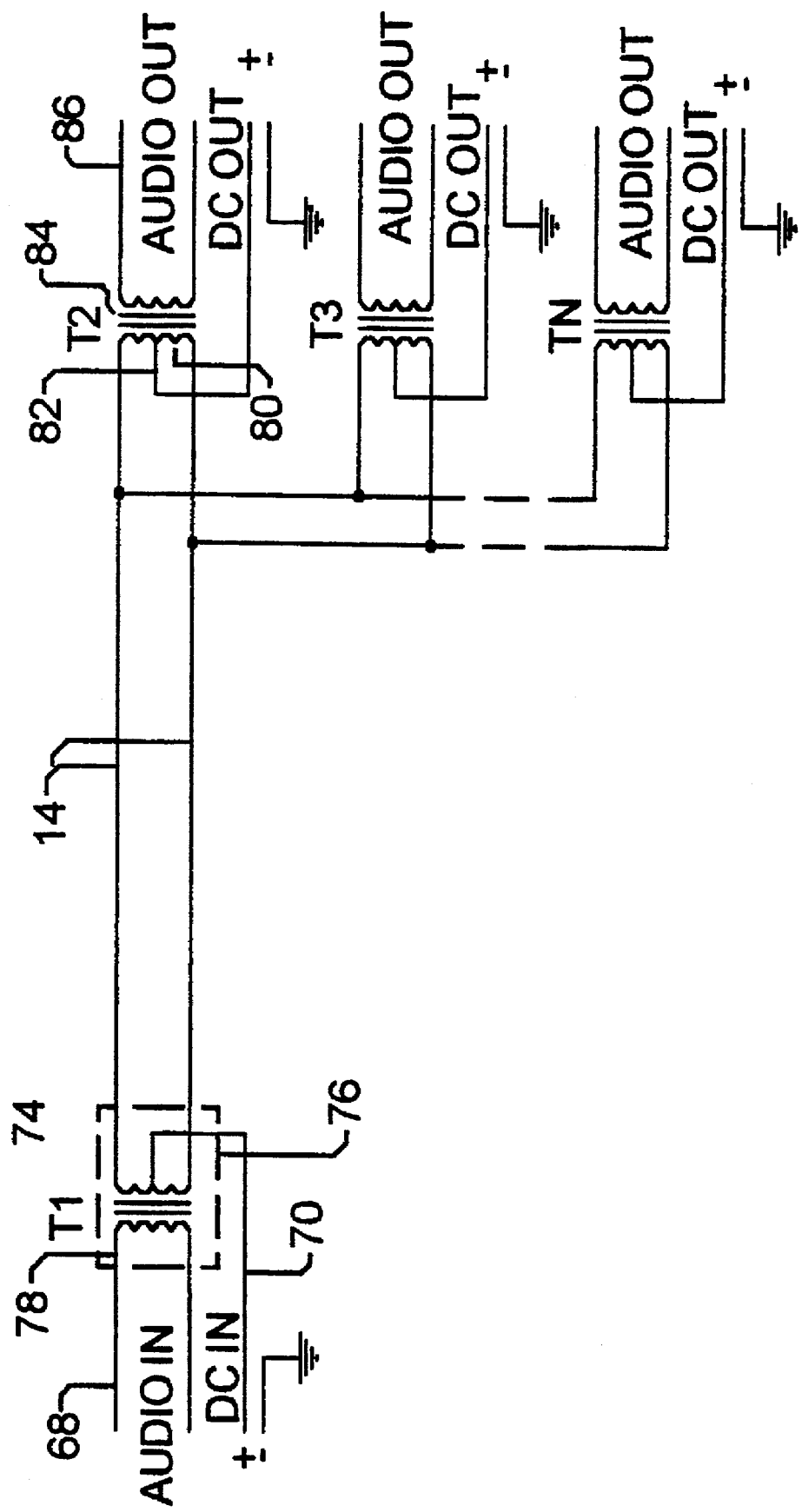
Figure 3:
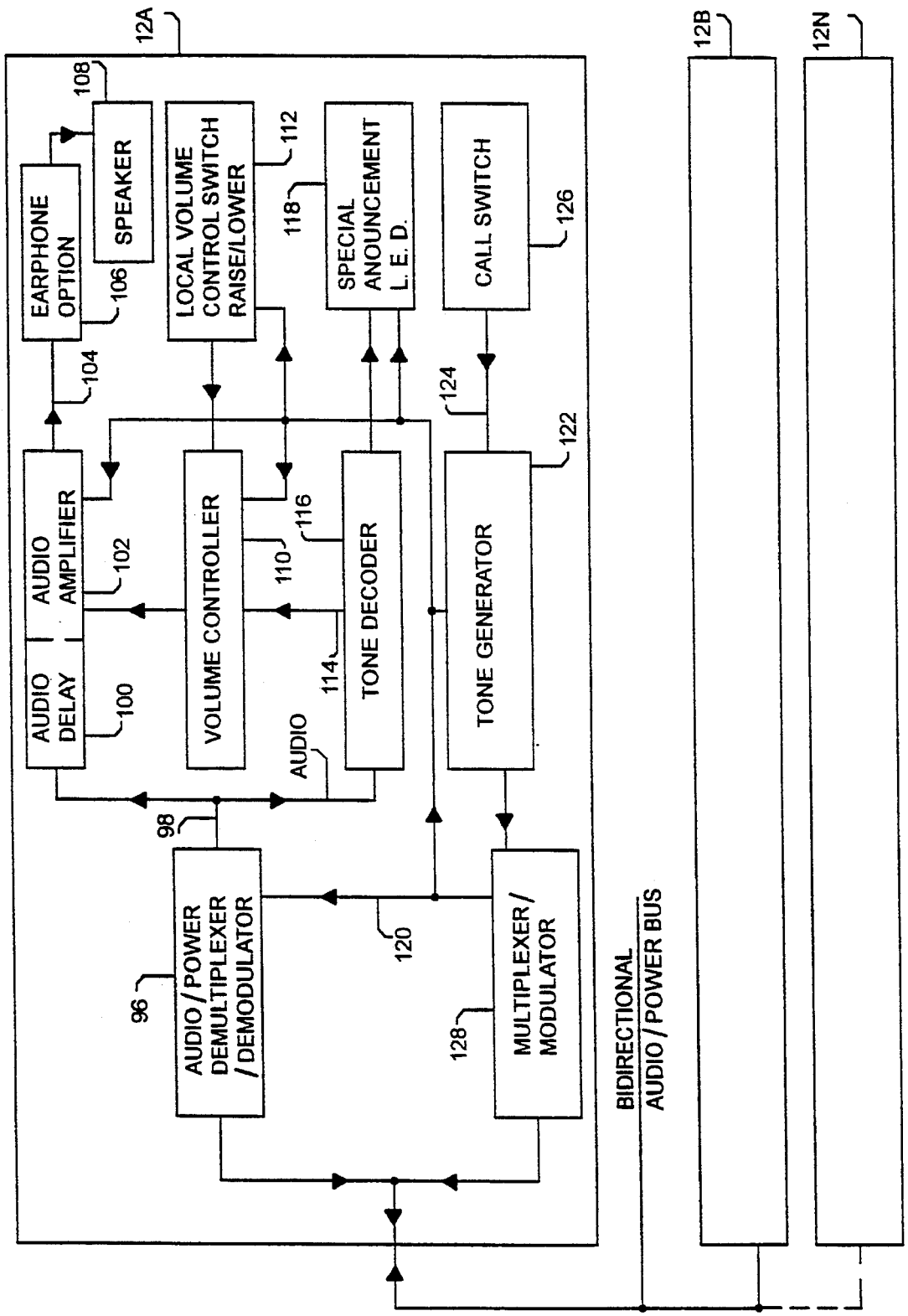
FIG. 3 is a block diagram illustrating the components of monitors forming part of the broadcast system shown in FIG. 1.

In FIGS. 1–3 there is shown a broadcast system made up of a transmitter circuit 10 shown in FIG. 1 and a plurality of discrete monitors 12-A, 12-B . . . 12N shown in FIG. 3 that are dedicated to individuals in a facility to receive an audio broadcast by the transmitter circuit 10. If desired, the audio portion of a video broadcast generally displayed in the facility may be distributed by the transmitter circuit 10 as part of the audio broadcast. The circuit 10 produces a composite audio signal on a bus 14 that extends throughout the facility which in the preferred embodiment takes the form of a mass transit vehicle. A suitable battery facility, not shown, is provided to insure operation of a period of time should there occur a power failure. As used herein, the term bus designates any of various ways of distributing an electrical signal throughout a facility and includes a coaxial cable, two twisted wires and the use of existing wiring within the facility. The signal supplied to the bus 14 supplies not only programming material that is reproduced at the various monitoring stations 12A, 12B . . . 12N but also a power supply for operation of the circuitry at each monitoring station.

The derivation of the audio portion of the signal applied to bus line 14 is in response to the control functions of a microcontroller 16. The microcontroller receives a plurality of input control signals which include a signal appearing on line 18 from a reader 20 for a programming card 20 and/or a signal appearing on line 22 from a barcode reader 24 and/or a signal appearing on line 26 as the output of switches 28 under local control by an operator suitably situated at a control console for the mass transit vehicle. The outputs from programming card reader 20, bar code reader 24 and local control switches 28 all form programming signals for the microcontroller 16. Programming may readily be provided with selections of the various advertisements, announcements and entertainment time segments. The programming on the transit vehicle includes the use of the programming card 20 or an instruction sheet containing a bar code for barcode reader 24. An operator at the operator's station starts operation of barcode reader 24 in the well known fashion to scan a selected bar code or inserts the program card 20 and/or sets local control switches 28 whose output serves to program the microcontroller 16.

The microcontroller is connected by a line 30 which exercises control of a audio/video reproducer whose output, as a result thereof, is an audio/video signal of which the audio portion appears on line 32 supplied to a switched line 66 in an audio mixer 34. The audio signals applied to audio mixer 34 include the audio output from an audio recorder/ audio reproducer 36 and an executive control signal appearing in line 38 as the output of an audio mixer 40. The audio mixer 40 has two input lines, one input line 42 extends to a tone generator 44 which is triggered to generate a tone alert signal in response to a signal appearing on line 46 which is an output control function of the microcontroller 16 responsive to a signal appearing on line 48 as an output signal of a switch 50 comprising a component of an announcement microphone 52. Switch 50 is preferably a "push to talk" switch so that when the switch is depressed an activation signal appears on line 48 for energizing the tone generator 44. An audio signal appears at the output of the microphone transducer forming part of the announcement microphone 52 is applied to an audio amplifier 54 whose output on line 56 forms the second input to audio mixer 40. Thus, audio mixer 40 will receive initially a tone generator signal triggered by the "press to talk" switch and thereafter an audio signal via the microphone transducer and audio amplifier 54. These sequentially occurring signals fed to the audio mixer 40 are applied by line 38 to audio mixer 34 and by a line 58. These signals become a control basis for the operation of an audio recorder/reproducer 36. The recorder 36 is inhibited when a signal appears at the in line 58 and in the absence of the signal by line 58, audio recorder/reproducer 36 responds to controls provided by an output in line 60 from microcontroller 16.

Preferably the microcontroller includes a microprocessor capable of being programmed through input commands as described hereinbefore. The audio recorder/reproducer 36 is preferably responsive to a sequence of commands from the microcontroller 16 in response to two consecutive keying operations of the switch 50 to record the given announcement for repeat at a later time when announcement video comes up in its normal sequence. A feedback line 62 provides status information of the audio recorder/reproducer 36 to the microcontroller 16. The microcontroller 16 has an output applied by line 66 to audio mixer 34. The output of mixer 34 is applied by line 68 for multiplexing with a power supply appearing on line 70 as the output of a power supply 71 in a multiplexer/modulator 72.

The power supply 71 includes a primary supply of direct current such as the electric system of the transit vehicle of a battery powered supply that continuously monitors for failure of the primary supply and automatically applies the battery back up when needed. An example of the circuitry suitable to form the audio/power multiplexer is shown in FIG. 2. The power output in line 70 is applied to the center tap of the secondary winding 74 of a transformer 76 whose end taps of the secondary winding are modulated outputs applied to bus 14. The primary coil 78 of transformer 76 is coupled to line 68 through suitable circuitry. The transformer arrangement shown in FIG. 2 offers the advantage that the audio signal will be 180° out of phase from line to line and will affect the transformer. In this way, transmission of audio and DC power over the same wires forming bus 14 induced noise picked up on the lines of the bus will be cancelled and the drive power will only limit the number of monitors 12A, 12B . . . 12N which can be powered at sites throughout the facility. Induced noise will be in phase and without affect on the transformer. FIG. 2 also illustrates the recovery of the audio signal and the DC power supply at each of monitoring stations throughout the facility. The details of the construction of the monitor of each station will be described in greater detail hereinafter. The recovery of the audio signal and DC power supply occurs by applying leads by the bus 14 to a transformer winding 80 having a center tap 82 which forms a DC output terminal. Winding 82 forms part of a transformer 84 having a second winding 86 whose output terminals form an audio output. Transformer 84 will be utilized at each monitor station as just described.

The bus 14 carries the output signal from the multiplexer/ modulator 72 throughout the facility and also forms a feedback path for locally generated signals at any of the monitoring stations. The feedback signal, for example, may be an alarm to signal that a rider desires to exit the bus at the next designated stop. As shown in FIG. 1, such an alarm is applied by the bus 14 to a demultiplexer/demodulator 88 whose output is applied to a tone decoder 89 to generate an alarm signal in line extending to a call display 90. The system shown in FIG. 1, when desired, is expanded to include the transmission and reception of encoded audio signals via antenna 91. The antenna 91 operates through a coupler 91A to transmit encoded signals from an encoder transmitter 92 in response to an audio signal at he output of the audio only recorder/reproducer 36. Such audio signal provides identification information of the transportation vehicle that is communicated via the signal emitted from antenna 91 to a receiver antenna, not shown, at a designated station along the route of the transportation vehicle. The receiving antenna at the designated station will supply the received signal to the circuitry to annunciated locally the information which is transmitted from the vehicle. The communication system using antenna 91 is also useful to receive a signal emitted from a designated station which will be supplied by a coupler 91A to a receiver 93 for decoding and supplying a corresponding signal to audio mixer 34 and thereby distribution throughout the system for announcement in the audio system.

FIG. 3 illustrates the circuitry for one of the plurality of monitoring stations 12A, 12B . . . 12N. The monitoring stations are identically constructed and include, as noted above in regard to FIG. 2, transformer 84 which forms part of an audio/power demultiplexer/demodulator 96 having an audio output line 98 connected through an audio delay 100 circuit in an audio amplifier 102. The amplifier applies an output signal to line 104 having an optional earphone jack 106 and a speaker 108. Amplifier 102 is driven in response to the volume controller 110 which is responsive to a local volume control switch 112 and an executive output signal generated within the volume controller 110 in response to a signal appearing on line 114 comprising the output of a tone decoder 116 having an input connected to the audio signal on output line 98. The volume controller when responding to the signal on line 114 establishes a predetermined volume level for the operation of an audio amplifier 102 which forms an executive volume control that follows preempting of programmed material by an executive tone alert signal which is the decoded output of tone decoder 116. When triggered, the output from the tone decoder 116 is applied to a signaling device such as an announcement LED 118 visible from the face of the monitoring station. A resident power supply is formed by a power supply output line 120 extending from the audio/power demultiplexer/demodulator 96. Power supply line 120 delivers the necessary operating current through operating amplifier 102, volume controller 110, local volume control 112, the announcement LED 118, tone decoder 116 and to a tone generator 122 which is triggered by the signal on line 124 from a pulse switch 126. The tone generator supplies an output signal to a multiplexer/modulator 128 which also receives a power supply by a branch of line 120. The output from the multiplexer/modulator is connected to the bus 14 to form a feedback path to the demodulator/demultiplexer 88, shown in FIG. 1 and described hereinbefore. The circuitry of FIGS. 1–3 allow that a tone can be recorded, prior to the recycling of the video information, to reset all speaker boxes to the ON position, if desired by the system user. In addition the system can also key on all speaker boxes for special local announcements made by the conductor, driver and etc., via a push to talk microphone.

Figure 4:
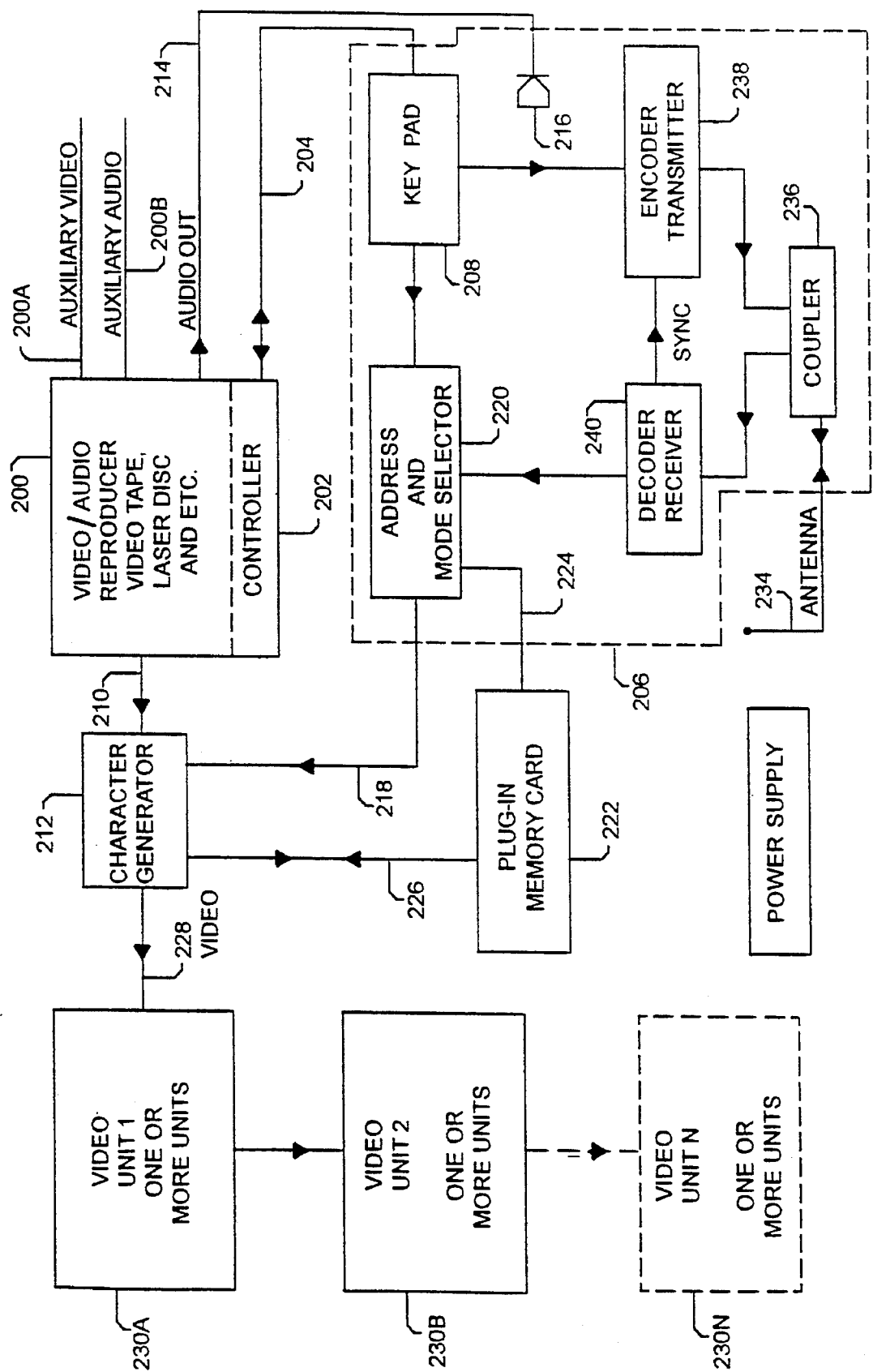
FIG. 4 block diagram of components forming a second embodiment of a broadcast system for broadcasting video for general designation in conjunction with discrete audio to persons in the facility.
Figure 5:
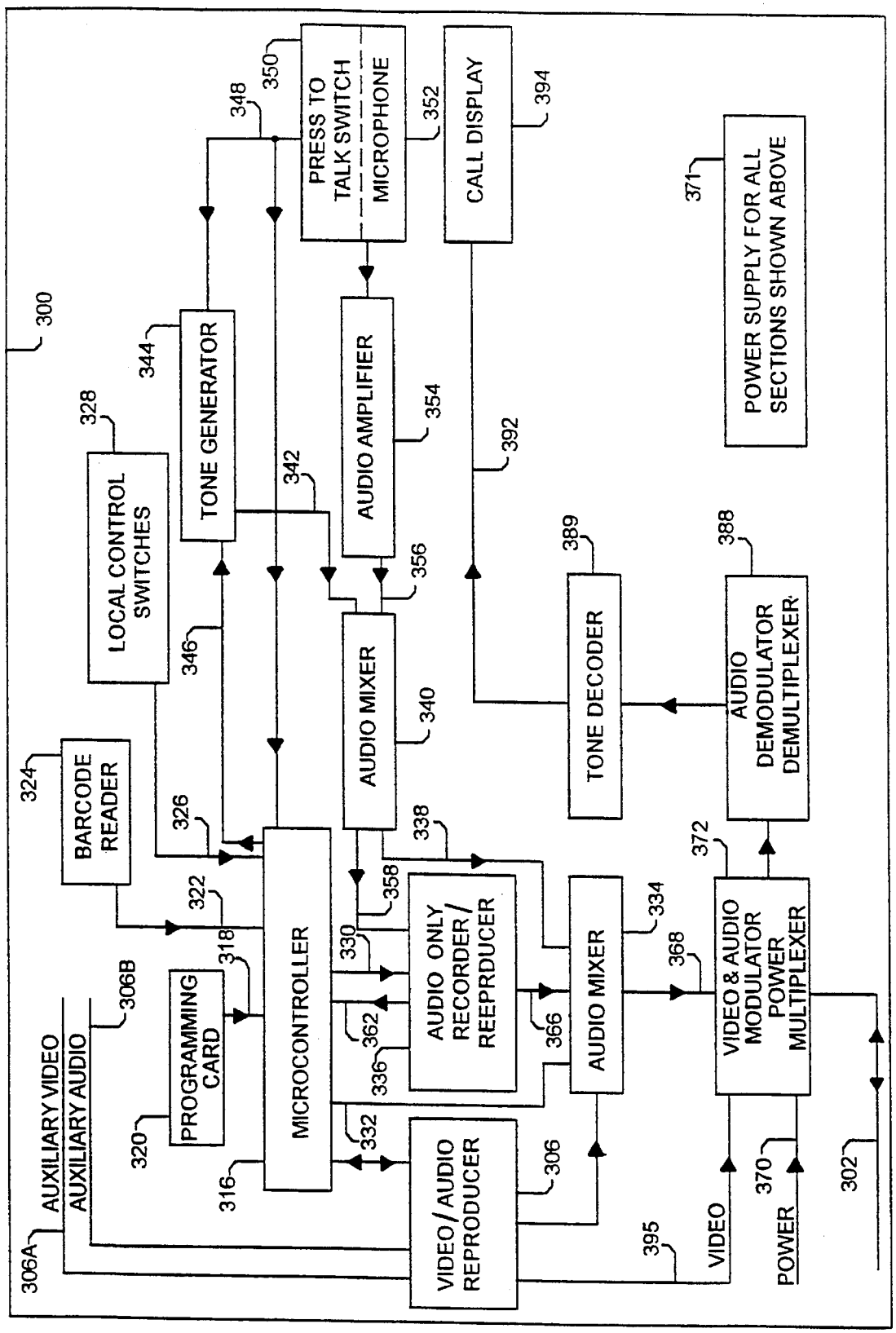
FIG. 5 is a block diagram of a third embodiment of broadcast system particularly useful for broadcasting a combination of audio and video signals using a conductor bus throughout a mass transit vehicle.

In a second embodiment of the broadcast system shown in FIG. 4, there is added to the system video stations spaced about the facility for shared use by a number of persons in conjunction with a plurality of speaker boxes. The transmitter embodiment of FIGS. 1–3 is including as part of a reproducer 200 for audio/video signals which can be derived from storage medium such as a magnetic tape, a compact or optical disk, and the like. The video reproducer includes a compact or optical disk player which can store up two and one half hours of video information from a storage disk. The player is connected to the stored video program into sections or cuts of various time segments. The compact or optical disk player can be controlled or programmed to select a certain program of the disk that are to be played. The compact or optical disk offers the features of substantially eliminating rewind time and avoiding no mechanical head contact to the disk. It is not necessary that the reproducer have recording capabilities but may if desired. The reproducer is responsive to compatible storage medium as magnetic tapes, compactor or optical disks and can be loaded into the reproducer. The reproducer 200, as shown, includes input terminals 200A and 200B for receiving video and audio input signals, respectively, from any of diverse sources.

The reproducer is controlled by controller 202 and may include an external control line 204 extending to an operators console 206. The control line 204 interacts with a key pad 208 used by an operator at console 206 to control the output of a signal from the reproducer on video line 210 which is connected to a character generator 212. The composite video frames from the video reproducer and alpha numeric character derived from encoded inputs, the audio output signal from the reproducer 200 is fed by line 214 to a speaker assembly 216 at the operators console 206 to allow monitoring of the audio. The character generator 212, for this purpose, receives an input signal by line 218 from an address and mode selector 220 situated at the operators console 206 and coupled to a key pad 208 to allow operator control of the reproducer 200, the character generator 212, and a memory card reader 222. Reader 222 is controlled by a signal in line 224 from the mode selector 220 to produce an output signal in line 226 in response to interchangeable plug-in cards containing read only programming. The output signal appearing on line 218 from the output from the address and mode selector 220 is a supervisory program signal and, as provided by key pad 208, a supervisor alert signal. These supervisory program and alert signals are combined with the broadcast signals appearing on video line 210 for transmission throughout the facility. The control exercised by the address and mode selector 220 over character generator 212 yields an output in a video line 228 for distribution to each of a plurality of monitors 230A, 230B . . . 230N. The video monitors display the video on line 228 which is composite of the video produced by the character generator 212 and video reproducer 200.

The outstanding features of this system is provision of a speaker box for or near each rider whereby the volume is controllable by the rider to suit particular needs or desires. The system is utilizing the features of video communication with an audio that allows special announcements to be played, all speaker boxes will be remotely controlled in response to a tone that is recorded on the recording prior to the announcement. After the announcement all speaker boxes can either return the audio level they were set to by the rider or remain on, as selected by the system user. Preferably the system as shown in FIG. 4, is expanded to include the transmission and reception of encoded signals via antenna 234. The antenna 234 operates through a coupler 236 to transmit encoded signals from a transmitter 238 in response to an output from key pad 208. Such a key pad entry made, for example, comprise identification information of the transportation vehicle that is communicated via the signal emitted from antenna 234 to a receiver antenna, not shown, at a designated station along the route of the transportation vehicle. The receiving antenna at the designated station will supply the received signal to the circuitry to display and/or annunciated locally the information which is transmitted from the vehicle. The communication system using antenna 234 is also useful to receive a signal emitted from a designated station which will be supplied by a coupler 236 to a receiver 240 for decoding and supplying a corresponding signal to address and mode selector and thereby distribution throughout the system for display by way of the character generator as a video insert or an announcement in the audio system.

In FIGS. 5-8 there is shown a third embodiment of a broadcast system in which both video and audio signals are dispersed by a common bus to discrete monitors for persons throughout the facility. The transmitter circuit 300 shown in FIG. 5 incorporates many of the component parts found in the embodiment of the transmitter 10 shown in FIG. 1. The circuit 300 produces a composite of audio, video and power appearing on bus 302 for distribution throughout the facility to individual monitors 304A, 304B . . . 304N (FIG. 8) for the powering of each monitor for broadcasting the audio and video signals. A video/audio reproducer 306, the same as video/audio reproducer 200 of the embodiment of FIG. 4, is provided to recover a video and audio signal for use in the facility. The video/audio reproducer 306, as shown, includes input terminals 306A and 306B for receiving video and audio input signals, respectively, from any of diverse sources. The derivation of the audio portion of the signal applied to bus line 302 is in response to the control functions of a microcontroller 316o The microcontroller receives a plurality of input control signals which include a signal appearing on line 318 from a programming card 320 and/or a signal appearing on line 322 from a barcode reader 324 and/or a signal appearing on line 326 as the output of switches 328 under local control by an operator suitably situated at a control console for the mass transit vehicle. The outputs from programming card 320, bar code reader 324 and local control switches 328 all form programming signals for the microcontroller 316. Programming may readily be provided with selections of the various advertisements, announcements and entertainment time segments. The programming on the transit vehicle includes the use of the programming card 320 or an instruction sheet containing a bar code for a barcode reader 324. An operator at the operator's station starts operation of barcode reader 324 in the well known fashion to scan a selected bar code or inserts the program card 320 and/or set local control switches 328 whose output serves to program the microcontroller 316.

The microcontroller is connected by a line 330 which exercises control of an audio/video reproducer 306 whose output, as a result thereof, is an audio/video signal of which the audio portion appears on line 332 supplied to a switched line 366 in an audio mixer 334. The audio signals applied to audio mixer 334 include the audio output from an audio recorder/audio reproducer 336 and an executive control signal appearing in line 338 as the output of an audio mixer 340. The audio mixer 340 has two input lines, one input line 342 extends to a tone generator 344 which is triggered to generate a tone alert signal in response to a signal appearing on line 346 which is an output control function of the microcontroller 316 responsive to a signal appearing on line 348 as an output signal of a switch 350 comprising a component of an announcement microphone 352. Switch 350 is preferably a "push to talk" switch so that when the switch is depressed an activation signal appears on line 348 for energizing the tone generator 344. An audio signal appears at the output of the microphone transducer forming part of the announcement microphone 352 is applied to an audio amplifier 354 whose output on line 356 forms the second input to audio mixer 340. Thus, audio mixer 340 will receive initially a tone generator signal triggered by the "press to talk" switch and thereafter an audio signal via the microphone transducer and audio amplifier 354. These sequentially occurring signals fed to the audio mixer 340 are applied by line 338 to audio mixer 334 and by a line 358. These signals become a control basis for the operation of an audio recorder/reproducer 336. The audio recorder/reproducer 336 is inhibited when a signal appears at the in line 358 and in the absence of the signal by line 358, audio recorder/reproducer responds to controls provided by an output in line 360 from microcontroller 316. Preferably the microcontroller includes a microprocessor capable of being programmed through input commands as described hereinbefore. The audio recorder/reproducer 336 is preferably responsive to a sequence of commands from the microcontroller 316 in response to two consecutive keying operations of the switch 350 to record the given announcement for repeat at a later time when announcement video comes up in its normal sequence. A feedback line 362 provides status information of the audio recorder/reproducer 336 to the microcontroller 316. The microcontroller 316 has an output applied by line 366 to audio mixer 334. The output of audio mixer 334 is applied by line 368 to a video and audio modulator/power multiplexer 372 for modulating the audio appearing on line 368 and the video signals appearing on line 395 onto a carrier and multiplexing the modulated signal with a power supply appearing on line 370 as the output of a power supply 371.

Figure 6:
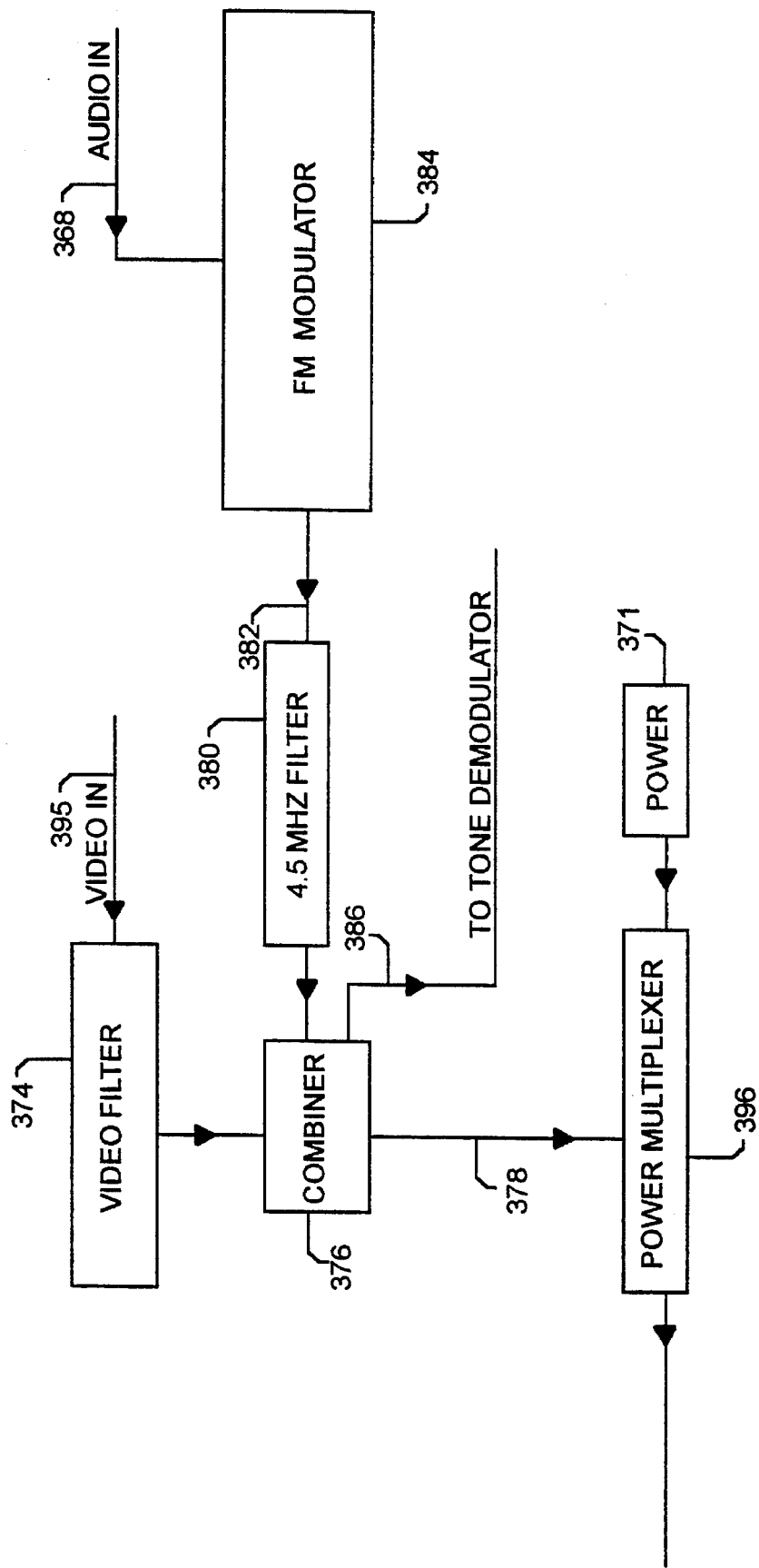
FIG. 6 is a block diagram of circuitry for combining audio, video and a power supply for distribution using a conductor bus in the system of FIG. 5.

An example of the circuitry suitable to form the video and audio modulation and power multiplexing is shown in FIG. 6. The input video by line 395 is fed to a video filter 374 whose output is applied to a combiner 376. The video filter 374 has a relatively sharp cut off after 4.5 MHZ to prevent any video over modulation from interfering with the audio portion of information that is to also be modulated on to the carrier. The combiner adds a 4.5 MHZ sub-carrier to the video to form a modulated output in line 378. The output of a FM modulator 384 which uses a 4.5 MHZ sub-carrier oscillator with a varactor diode input to modulate an audio input appearing on line 368 to produce the desired FM modulated output at line 382 and filtered at the 4.5 MHZ filter 380. The combiner 376 is used to supply a feedback signal such as a modulated tone in line 386 that is applied as an input to an audio demodulator/demultiplexer 388 and in turn connected to a tone decoder 389 for the recovery of a signal that is locally generated at any of the monitoring stations. The decoded signal is applied by line 392 to a call display 394 and may be an alarm signal that a rider desires to exit the bus at the next desired stop.

Figure 7:
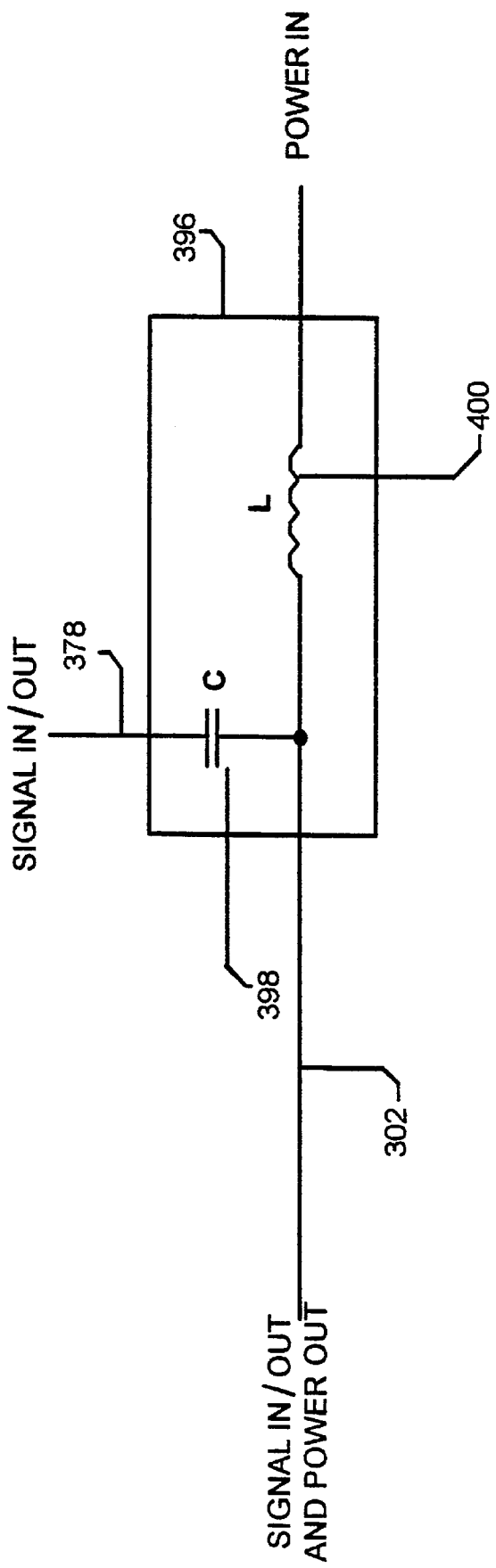
FIG. 7 is an electrical diagram to illustrate a multiplexing of power and broadcast signals for a co-axial type cable distribution system.

Returning again to FIG. 6, the modulated output appearing on line 378 is applied to a power multiplexer 396 having an input connected to receive DC power from supply 371. Multiplexer 396 forms an output appearing on line 302 that can be communicated throughout the facility by a co-axial cable, for example, to supply the video with a 4.5 MHZ aural sub-carrier and power. FIG. 7 illustrates a simplified form of the power multiplexer 396 in which the combined input in line 378 is applied to a capacitor 398 used to block the DC voltage from the combiner 376. An inductor 400 serially connected in the power line with the output side of the capacitor prevents the video and 4.5 MHZ sub-carrier from feeding into the power supply 371. In this way, the output signal fed to the coaxial cable will have the video, 4.5 MHZ sub-carrier and the DC power impressed on it. In this way, transmission of audio, video and DC power over the same wires forming the bus 302.

Figure 8:
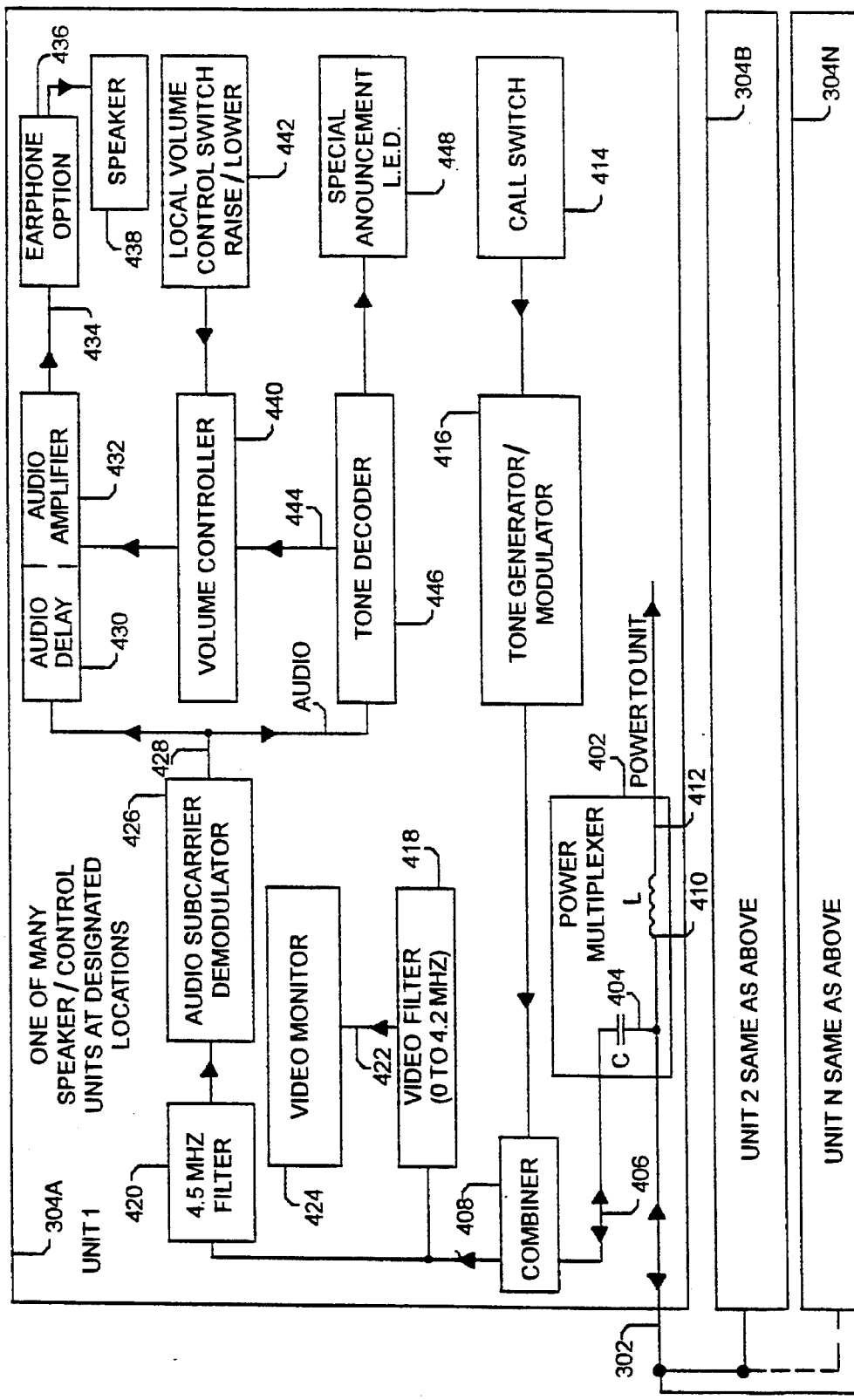
FIG. 8 is a block diagram illustrating the components of monitors for recovering the audio and video broadcast signals according to the broadcast system of the third embodiment of FIG. 5.

FIG. 8 illustrates the circuitry for one of the plurality of monitoring stations 304A, 304B . . . 304N. The monitoring stations are identically constructed and include circuitry that is essentially the reverse of modulating/multiplexing functions to produce the composite signal distributed by bus 302. The signal in bus 302 is applied to a power multiplexer 402 wherein a capacitor 404 blocks the DC power but passes the video and aural signals to line 406 forming an input to a combiner 408. An inductor 410 recovers DC power which is distributed by line 412 to the components of the monitor for fulfilling their power requirements for stand along operation. The combiner 408 provides a feedback path to the transmitter by which a call signal produced by call switch 414 is applied to a tone generator/modulator 416 so that the modulated tone signal can be transmitted through the combiner 408 to the bus 302 for recovery at the transmitter as described hereinbefore. The output of combiner 408 is applied to a video filter 418 and an audio filter 420. The video filter applies a modulated signal in a band up to 4.2 MHZ for recovery of the video portion of the signal which is applied by line 422 to a video monitor 424. Filter 420 applies the recovered signal to an audio sub-carrier demodulator 426 which recovers the audio portion of the transmitted signal that is applied by output line 428 connected through an audio delay circuit 430 in an audio amplifier 432. The amplifier applies an output signal to line 434 having an optional earphone jack 436 and a speaker 438. Amplifier 432 is driven in response to the volume controller 440 which is responsive to a local volume control switch 442 and an executive output signal generated within the volume controller 440 in response to a signal appearing on line 444 comprising the output of a tone decoder 446 having an input connected to the audio signal on output line 428. The volume controller when responding to the signal on line 444 establishes a predetermined volume level for the operation of an audio amplifier 432 which forms an executive volume control that follows preempting of programmed material by an executive tone alert signal which is the decoded output of tone decoder 446. When triggered, the output from the tone decoder 446 is applied to a signaling device such as an announcement LED 448 visible from the face of the monitoring station. A resident power supply is formed by a power supply output line 412 extending from the audio/power demultiplexer/demodulator 402. Power supply line 412 delivers the necessary operating current through audio amplifier 432, volume controller 440, local volume control 442, the announcement LED 448, tone decoder 446 and to a tone generator 416.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What claim:

1. A broadcast system for a facility, said system including:
   means for producing each of a plurality of broadcast signals including a program signal, a supervisory program signal and a supervisory alert signal;
   a supervision controller for said broadcast signals;
   power supply means having output terminals on which there appears a desired power supply for monitoring stations;
   means for combining said program signals with said power supply to form an output signal suitable for broadcast within said facility;
   bus means for distributing said output signal in said facility to each of a plurality of monitor stations; and
   said plurality of monitoring stations each including;
   (a) means connected to said bus means to recover broadcast signals and form a resident power supply for that monitor station only from said output signal,
   (b) a monitor coupled to a resident amplifier and powered by said resident power supply for responding to any of said plurality of recovered broadcast signals,
   (c) a resident controller for controlling said resident amplifier when receiving a program signal supplied to said monitor, and
   (d) a resident executive controller for overriding said resident controller and applying said supervisory alert signal and supervisory program signal to said resident amplifier.

2. The broadcast system according to claim 1 wherein said supervisory program signal and said supervisory alert signal comprise audio signals and wherein said resident controller establishes a predetermined output signal from said resident amplifier for operation of a speaker.

3. The broadcast system according to claim 1 wherein said broadcast signals include an output signal from a compact or optical disk player.

4. The broadcast system according to claim 1 wherein said broadcast signals include audio signals.

5. The broadcast system according to claim 1 wherein said supervision controller includes a microcontroller and local control switches having outputs for programming said microcontroller.

6. The broadcast system according to claim 1 wherein said supervisory alert signal is generated by switch means of a push to talk microphone.

7. The broadcast system according to claim 6 wherein said supervisory program signal includes an audio output of said push to talk microphone and wherein said means for producing includes an audio only recorder reproducer and a video reproducer and wherein said supervisory program signal controls said speaker station.

8. The broadcast system according to claim 1 wherein said broadcast signals include means for generating an end of message signal to form part of said supervisory program signal, 9. The broadcast system according to claim 1 wherein said supervision controller includes a bar code reader.

10. The broadcast system according to claim 1 wherein said power supply means includes a primary power supply and a battery powered power supply means, 11. The broadcast system according to claim 1 wherein said supervisory controller includes a programming card.

12. The broadcast system according to claim 1 wherein said monitor includes a speaker, 13. The broadcast system according to claim 10 wherein said plurality of monitoring stations each further include speaker control means for applying any of said plurality of recovered broadcast signals to said speaker.

14. The broadcast system according to claim 1 wherein said facility includes a transportation vehicle further including an encoder transmitter means including an antenna for transmitting an RF signal to a designated station along a route of a transportation vehicle; and means joined by a coupler to said antenna for applying an RF signal from the designated station for broadcast in said vehicle.

15. The broadcast system according to claim 1 further including an encoder transmitter means for applying an encoded RF signal to an antenna on a transportation vehicle forming said facility from a designated station along route of said transportation vehicle and a decoder joined by a coupler to said antenna for applying an RF signal from said transportation vehicle for broadcast at said designated station.

16. The broadcast system according to claim 1 wherein said monitor includes means for displaying a video signal.

17. The broadcast system according to claim 16 further including a character generator means for applying a line assignment in a video portion of said broadcast signal.

18. The broadcast system according to claim 16 wherein said means for producing each of a plurality of broadcast signals include input terminals for receiving a video signal and an audio signal.

19. The broadcast system according to claim 1 wherein said monitor includes an earphone jack.

20. The broadcast system according to claim 1 wherein said resident executive controller includes a tone decoder.

21. The broadcast system according to claim 1 wherein said monitor stations further include signal generating means for applying a feed back signal to said bus means and means for receiving said feedback signal for display in said facility.

22. The broadcast system according to claim 1 wherein said resident executive controller establishes a predetermined volume for an audio signal comprising said supervisory program signal and supervisory alert signal.

23. The broadcast system according to claim 1 further including means for recording audio signals including an audio signal corresponding to said supervisory program signal and said supervisory alert signal.

24. The broadcast system according to claim 23 wherein said means for recording are responsive to a keyed output of a switch forming part of a press to talk microphone.

25. The broadcast system according to claim 1 wherein said supervision controller includes a microprocessor.

26. The broadcast system according to claim 1 wherein each of said monitors include signaling means responsive to said supervisory alert signal.

27. The broadcast system according to claim 26 wherein said signaling means includes a light emitting diode.

28. The broadcast system according to claim 26 wherein said signaling means includes a speaker.

29. A broadcast system for a facility, said system including:

means for producing each of a plurality of broadcast audio signals including a program signal, a supervisory program signal and a supervisory alert signal;

a supervision controller for said broadcast audio signals;

power supply means having output terminals on which there appears a desired power supply for monitoring stations;

means for combining said broadcast audio signals with said power supply to form an output signal suitable for broadcasting within said facility;

bus means for distributing said output signal in said facility to each of a plurality of monitor stations; and said plurality of monitoring stations each including;
(a) means connected to said bus means to recover broadcast audio signals and form a resident power supply from said output signal,
(b) a speaker coupled to a resident amplifier and powered by said resident power supply for responding to any of said plurality of recovered broadcast audio signals,
(c) a resident controller for controlling said resident amplifier when receiving a program signal supplied to said speaker, and
(d) a resident executive controller for disabling said resident controller and applying said supervisory alert signal and supervision program signal to said resident amplifier.

30. The broadcast system according to claim 1 wherein said means for combining said broadcast signals with said power supply includes a transformer having a primary coil coupled to receive said broadcast signals, said transformer having a secondary coil having a center tap coupled to said power supply and end taps of said secondary coil forming said bus means and wherein monitoring stations each further include a transformer having first and second windings, said first winding being coupled to said bus means, said first winding having a center tap for recovering said power supply and said second winding forming a supply of said broadcast audio signal.

* * * * *